(12) United States Patent
Culley

(10) Patent No.: US 6,615,753 B1
(45) Date of Patent: Sep. 9, 2003

(54) EXPANDABLE STINGER PLANTER

(75) Inventor: Daniel A. Culley, Dayton, WA (US)

(73) Assignees: Northwest Revegetation, Hamilton, MT (US); Ecological Restoration, Inc., Hamilton, MT (US)

( * ) Notice: Subject to any disclaimer, the term of this patent is extended or adjusted under 35 U.S.C. 154(b) by 0 days.

(21) Appl. No.: 10/060,890

(22) Filed: Jan. 29, 2002

Related U.S. Application Data

(63) Continuation-in-part of application No. 09/635,829, filed on Aug. 9, 2000, now Pat. No. 6,341,568, which is a continuation-in-part of application No. 09/338,322, filed on Jun. 22, 1999, now Pat. No. 6,158,362.

(51) Int. Cl.$^7$ .............................................. A01C 11/00
(52) U.S. Cl. ..................... 111/117; 111/115; 111/200; 111/105; 111/195; 37/406; 414/912; 172/538
(58) Field of Search ................................ 111/117, 102, 111/104, 105, 106, 115, 919, 200, 195, 196; 37/403, 406; 47/1.01 R, 1.01 F, 1.01 T; 414/912; 172/533

(56) References Cited

U.S. PATENT DOCUMENTS

| | | | |
|---|---|---|---|
| 1,077,822 A | 11/1913 | Engleman | |
| 2,891,813 A | 6/1959 | Inaki | |
| 3,176,635 A | 4/1965 | Mabon | |
| 3,558,177 A | 1/1971 | Snead | 294/70 |
| 3,765,347 A | 10/1973 | Tormstrom | |
| 3,872,805 A * | 3/1975 | Kolk et al. | 111/100 |
| 3,972,294 A | 8/1976 | Grundstrom et al. | |
| 3,998,171 A | 12/1976 | Lofgren et al. | 111/2 |
| 4,060,043 A | 11/1977 | Lofgren | 111/3 |
| 4,067,268 A | 1/1978 | Lofgren et al. | |
| 4,186,671 A * | 2/1980 | Huang | 111/104 |
| 4,307,827 A * | 12/1981 | Turunen | 111/104 |
| 4,342,270 A | 8/1982 | Lofgren et al. | 111/1 |
| 4,597,343 A * | 7/1986 | Nambu | 111/105 |
| 4,920,900 A | 5/1990 | Clemens | |
| 4,932,338 A * | 6/1990 | Watanabe et al. | 111/102 |
| 4,941,416 A | 7/1990 | Faulring | |
| 5,024,172 A * | 6/1991 | Huber | 111/104 |
| 5,209,170 A * | 5/1993 | Kobayashi | 111/105 |
| 5,823,126 A * | 10/1998 | Kolk et al. | 111/100 |
| 6,073,564 A * | 6/2000 | Keskilohko | 111/105 |
| 6,158,362 A * | 12/2000 | Culley | 111/101 |
| 6,341,568 B1 * | 1/2002 | Culley | 111/101 |

* cited by examiner

*Primary Examiner*—Victor Batson
(74) *Attorney, Agent, or Firm*—Wells St. John P.S.

(57) ABSTRACT

Expandable stinger planting is described in which stinger probes on a boom end mounted frame are positioned for ground penetration on a boom type vehicle. Bottom ends of the probes are shifted between a closed plant receiving, ground penetrating positions; and open positions with bottom ends open to form a plant discharge opening. A receptacle within the probes is open to the plant discharge opening, and receives plants from a magazine. Plants move by a feeder device in the magazine to a release station, where successive plants may be discharged into the plant receiving receptacle. The plant magazine and plant release station are positioned above the plant receiving receptacle such that a plant moved to the release station may drop into the receiving receptacle, to be discharged through the discharge opening. Packers may be provided on the frame to press planting media about the plants.

38 Claims, 10 Drawing Sheets

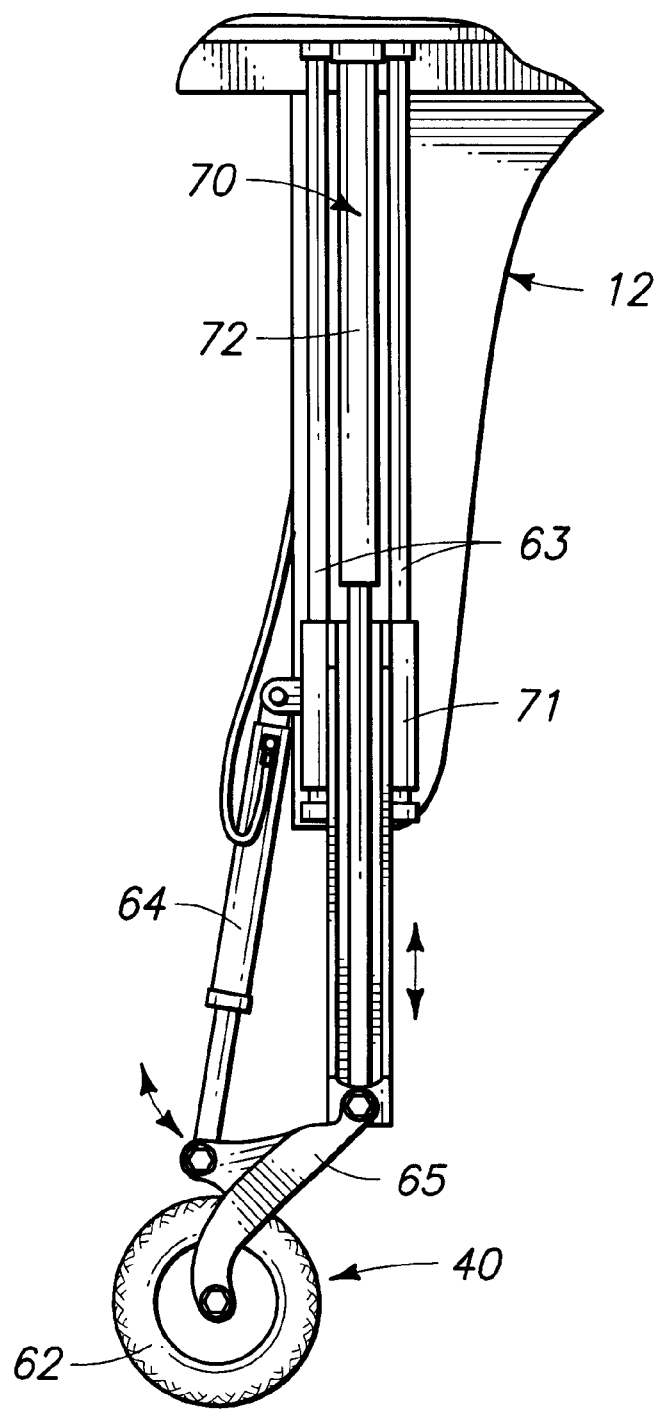
_FIG 7_

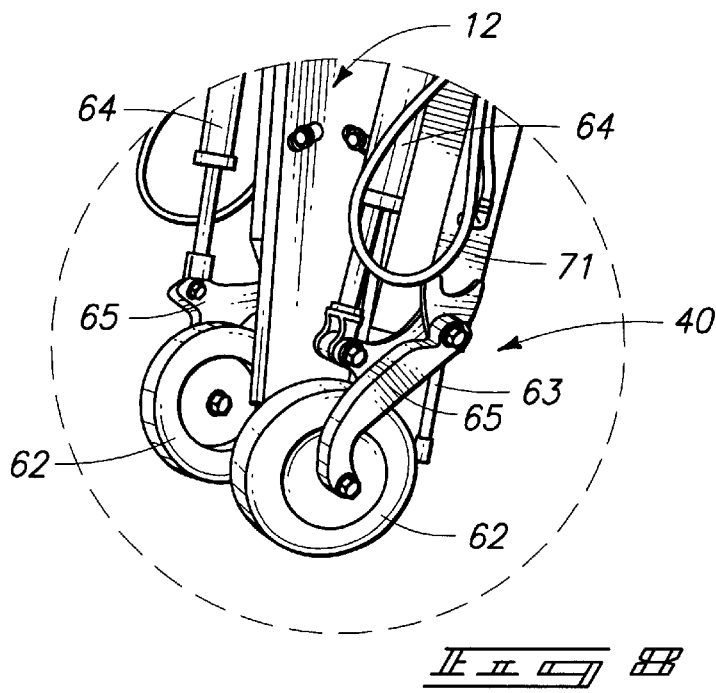
FIG. 8
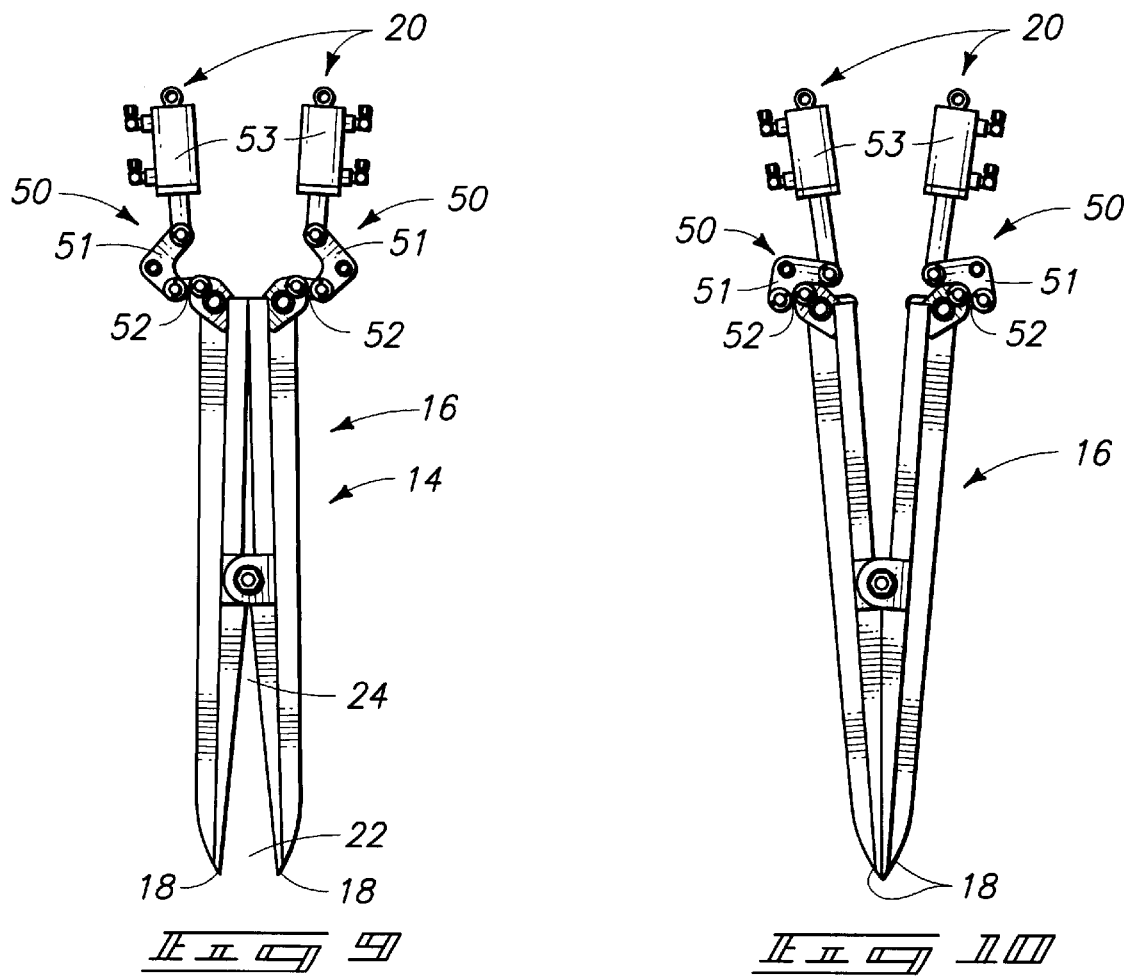
FIG. 9
FIG. 10

EXPANDABLE STINGER PLANTER

CROSS REFERENCE TO RELATED APPLICATION

This application is a continuation in part of U.S. patent application Ser. No. 09/635,829, filed on Aug. 9, 2000 and issued as U.S. Pat. No. 6,341,568 Jan. 29, 2002, and which is a continuation in part of U.S. patent application Ser. No. 09/338,322, filed on Jun. 22, 1999 and now issued as U.S. Pat. No. 6,158,362; both of which are incorporated by reference herein.

TECHNICAL FIELD

The present invention relates to planting and more particularly to apparatus for performing planting operations.

BACKGROUND OF THE INVENTION

Planting of vegetation in rough terrain has long been a difficult and tedious process. In fact, most planting done on steep embankments or rocky terrain has been accomplished by hand, because mechanized planters are often not capable of negotiating the terrain. Further, bulky planting machinery can damage the surrounding area and seriously compromise the surrounding habitat.

Hand planting in steep, rocky, or otherwise rough terrain is often not successful because the conditions do not permit the planter to dig deep enough to secure the plants. Also riparian areas are typically difficult to plant because the plant stock cannot be secured deeply in the embankment to prevent high water from washing the plants away.

Re-planting vegetation along riparian ways that have been denuded by flooding is ecologically desirable, not only to bolster the shorelines against erosion, but also to re-establish fish and wildlife habitat. Still, it is difficult and sometimes seemingly impossible to successfully plant such areas. Shallow rooted whips of willow, cottonwood and the like are easily washed away at high water, or become easy forage for beaver and deer, so strenuous hand planting operations in such areas do not often result in an acceptable percentage of surviving plants.

Even flat fertile areas can be difficult to re-plant. For example, closely spaced stumps in clear cut areas will often prevent the use of mechanized planting, so expensive hand planting is often the only process available. Further, the planting media may be bound with roots, rocks, or hard soil, frustrating hand planting processes.

Another problem faced in mechanized and hand planting operations, is that planting dibbles, shovels, picks and the like will often leave a hole with a packed wall caused by the tool wedging into the soil. This "shear wall" will hamper proper dispersal of roots and often results in poor or unsuccessful growth.

A present and growing need is therefore realized for a mechanized planter that will reduce, if not eliminate, the need for hand planting in difficult areas. There is also a need for a mechanized planter that will function to plant at a much greater depth than has yet been feasible in hand or mechanized planting operations, without creating the "shear wall" effect.

A need has also remained to reduce the need for an attendant to load a planter in a "single shot" style by which a single plant is hand fed to the planter and the planting operation must take place before another plant is hand fed to the planter for a subsequent planting cycle.

A need also exists for soil packing about the individual plants following retraction of the planting device. Packing firms soil around the plant to provide physical support and reduce exposure of the root area to air.

As a solution to the above problems, the present planter can be attached to an excavator boom for remote operation at various angles to the surrounding terrain, so difficult terrain can be planted from adjacent accessible areas.

The present planter may be attached to the bucket end of an excavator boom and used by the excavator operator for deep planting operations that are best used for plants such as whips (tree cuttings) or root crop (such as tree seedlings) in a manner intended to avoid wash out and damage from animals. Such planting may be done at locations in a radius from the excavator (within the boom reach) in terrain that would not be otherwise accessible to other mechanized planters.

A magazine feed may be provided to feed a succession of plants to the planter and thereby minimize the need for the planter to be moved from plant site to loading site after each planting operation. Instead, a plurality of plants may be loaded, then fed successively to the planter such that numerous planting operations may take place before reloading is required.

BRIEF DESCRIPTION OF THE DRAWINGS

Preferred embodiments of the invention are described below with reference to the following accompanying drawings.

FIG. 7 is a fragmented side elevation view showing a preferred packer arrangement;

FIG. 8 is a partial perspective view of the preferred packer;

FIGS. 9 and 10 are detailed operational views of preferred probes and probe actuators;

DETAILED DESCRIPTION OF THE PREFERRED EMBODIMENTS

Figure 1:
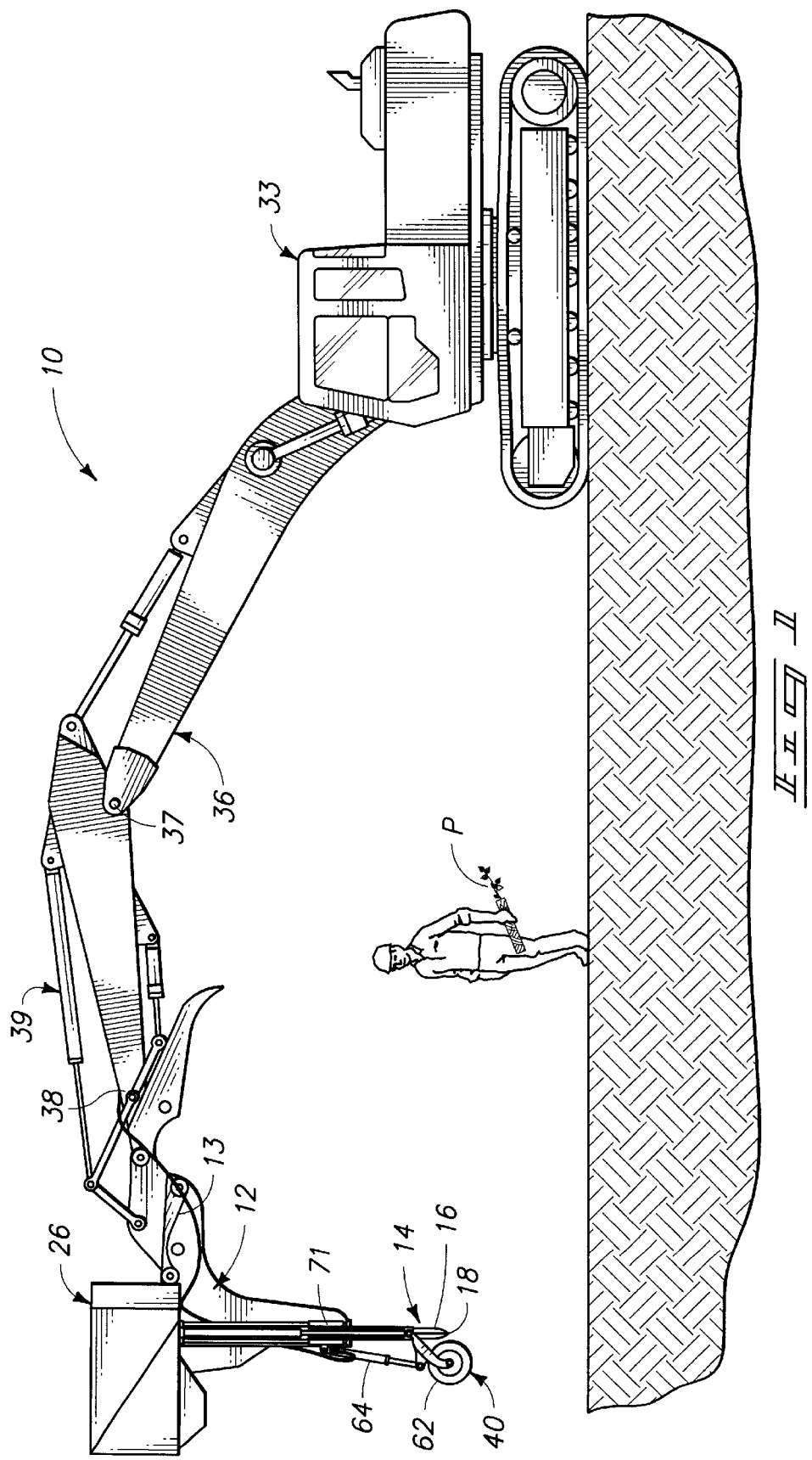
FIG. 1 is a side elevation view illustrating the presently preferred planter mounted on an excavator.

This disclosure of the invention is submitted in furtherance of the constitutional purposes of the U.S. Patent Laws "to promote the progress of science and useful arts"(Article 1, Section 8).

Before entering into detailed discussions of various elements of the preferred forms of my invention, general aspects of the invention will be described.

In a first aspect, the expandable stinger planter 10 generally includes a stinger mounting frame 12 and a stinger 14 with a pair of elongated probes 16 mounted to the stinger mounting frame 12 and extending to bottom ends 18 that are configured for ground penetration. An actuator assembly 20 (FIG. 3) is provided on the stinger mounting frame 12 and is connected to at least one of the probes 16 to shift the bottom ends 18 relative to one another between a closed position (FIG. 3 and others) wherein the bottom ends 18 are at least substantially closed together, and an open position (FIG. 5 and others) wherein the bottom ends 18 are opened and form a plant discharge opening 22. An internal plant receiving receptacle 24 (FIG. 4) within the probes 16 is open to the plant discharge opening 22. A plant magazine 26 on the stinger mounting frame 12 is configured to receive and organize a plurality of plants P in a prescribed array. The plant magazine 26 includes at least one plant release station 28, through which successive plants P may be discharged into the plant receiving receptacle 24. A plant feeder 30 is situated adjacent the plant magazine 26 and is operable to move a plant P in the plant magazine 26 to the plant release station 28. The plant magazine 26 and plant release station 28 are positioned above the plant receiving receptacle 24 such that a plant P moved to the plant release station 28 may drop into the plant receiving receptacle 24, to be discharged from the plant receiving receptacle 24 through the plant discharge opening 22.

In another aspect, the expandable stinger planter 10 is provided in combination with a vehicle 33 including a movable boom 36 extending to a boom end 38. A stinger mounting frame 12 is mounted to the boom end 38 for movement responsive to movement of the boom 36. A stinger 14 is comprised of a pair of elongated probes 16 that are mounted to the stinger mounting frame 12. The probes extend to bottom ends 18 that are configured for ground penetration. An actuator assembly 20 on the stinger mounting frame 12, is connected to at least one of the probes to shift the bottom ends 18 relative to one another between a closed position wherein the bottom ends 18 are at least substantially closed together, and an open position wherein the bottom ends 18 are opened and form a plant discharge opening 22. An internal plant receiving receptacle 24 within the probes 16 is open to the plant discharge opening 22. A plant magazine 26 on the stinger mounting frame 12 is configured to receive and organize a plurality of plants P in a prescribed array. The plant magazine includes at least one plant release station 28 through which successive plants P may be discharged into the plant receiving receptacle 24. A plant feeder 30 adjacent the plant magazine is operable to move a plant P in the plant magazine 26 to the plant release station 28. The plant magazine 26 and plant release station 28 are positioned in relation to the plant receiving receptacle 24 such that a plant P moved to the plant release station 28 may drop into the plant receiving receptacle 24, to be discharged from the plant receiving receptacle 24 through the plant discharge opening 22.

In a still further aspect, the expandable stinger planter 10 includes a stinger mounting frame 12. A stinger 14, comprised of a pair of elongated probes 16 mounted to the stinger mounting frame 12 and extending to bottom ends 18, is configured for ground penetration. An actuator assembly 20 on the stinger mounting frame 12, is connected to at least one of the probes 16 to shift the bottom ends 18 relative to one another between a closed position wherein the bottom ends 18 are at least substantially closed together, and an open position wherein the bottom ends 18 are opened and form a plant discharge opening 22. An internal plant receiving receptacle 24 (within the probes) is open to the plant discharge opening 22. At least one packer member 40 is operably mounted to the stinger mounting frame 12 and is positioned adjacent the probes 16.

In a yet further aspect, the expandable stinger planter 10 includes a vehicle 33 including a movable boom 36 extending to a boom end 38. A stinger mounting frame 12 is mounted to the boom end 38 for movement responsive to movement of the boom 36. A stinger 14, comprised of a pair of elongated probes 16, is mounted to the stinger mounting frame 12 and extends to bottom ends 18 that are configured for ground penetration. An actuator assembly 20 on the stinger mounting frame is connected to at least one of the probes 16 to shift the bottom ends 18 relative to one another between a closed position wherein the bottom ends 18 are at least substantially closed together, and an open position wherein the bottom ends 18 are opened and form a plant discharge opening 22. An internal plant receiving receptacle 24 within the probes 16 is open to the plant discharge opening 22. At least one packer member 40 is operably mounted to the stinger mounting frame 12 and positioned adjacent the probes 16.

Another aspect includes a planting process, comprising mounting a stinger mounting frame 12 to a boom 36 of a boom type excavator 33. A stinger 14 is mounted to the stinger mounting frame 12 and is comprised of a pair of elongated probes 16 extending to bottom ends 18 that are movable between an open position wherein the bottom 18 ends are spaced apart to form a plant discharge opening 22, and a closed position wherein the probe ends 18 are closed together. The process further includes providing a plant magazine on the stinger mounting frame; placing plants in the magazine; moving a selected plant in the magazine to a plant release station; moving the selected plant from the plant release station to a position between the probes in the closed position; operating the boom to drive the bottom ends of the probes into a planting media; moving the probes to the open position; and lifting the probes from the planting media while leaving the plant in the planting media.

Referring now in greater detail to various preferred elements, attention is firstly directed to FIG. 1 where a preferred form of the planter 10 includes a combination in which the stinger 14 and related elements are provided along with a boom type vehicle such as the illustrated excavator 33. Thus the present planter 10 may thus be produced and distributed in combination with the vehicle 33.

Figure 2:
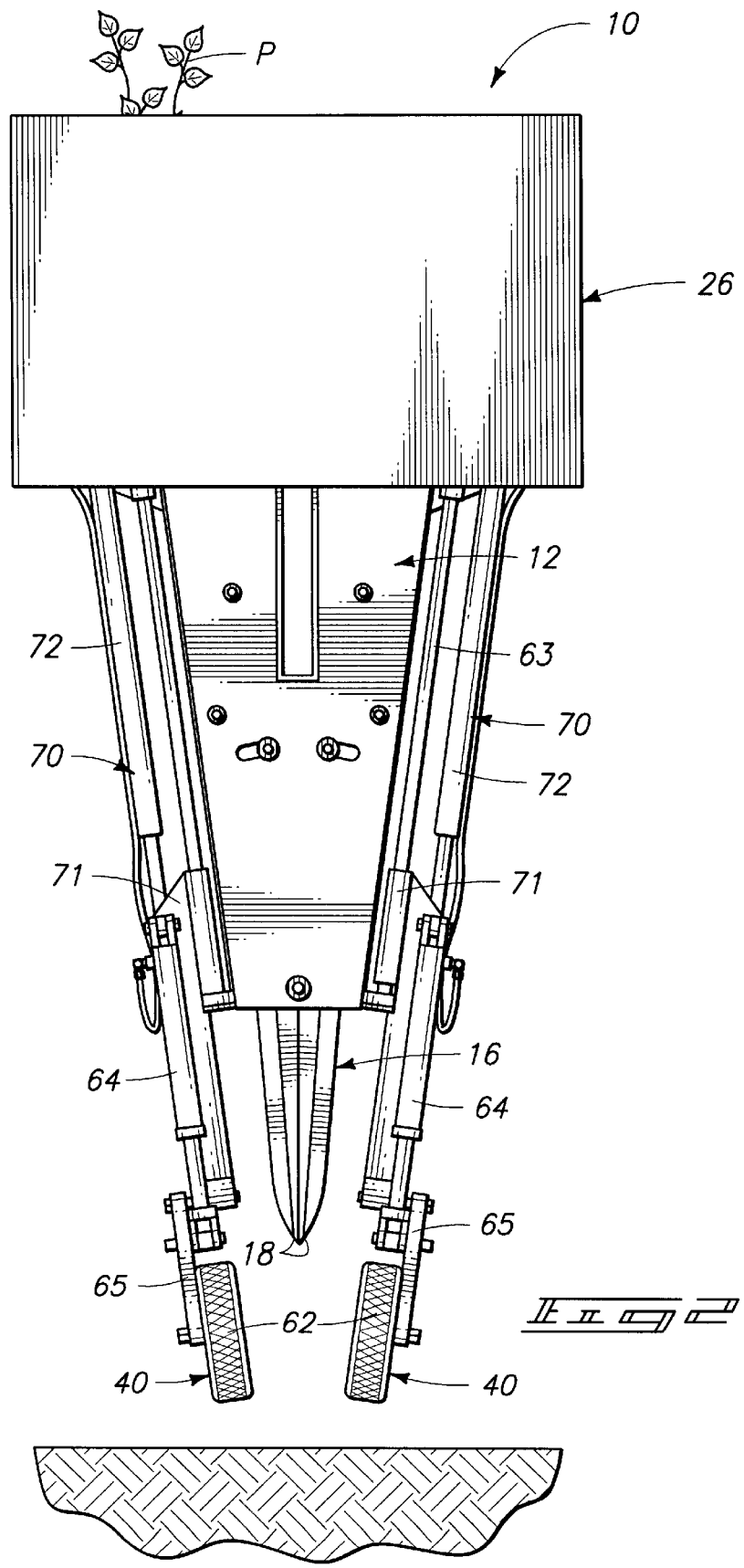
FIG. 2 is an elevation view of a preferred stinger, plant magazine, and packer arrangement.

It is also pointed out that a subcombination (see FIG. 2) may also be provided, which may include the same stinger 14 and related elements configured to be attached or retrofitted to an existing boom type vehicle 33. Thus, the stinger mounting frame 12, and elements that are mounted directly or indirectly thereto, may be produced and distributed for subsequent mounting to the boom of an existing vehicle.

The preferred vehicle 33 in either combination or subcombination form is conventional and will not be described in detail herein. It is sufficient to note that the preferred vehicle is self powered and includes a movable and extendable boom 36. Most preferably, the boom 36 is articulated at a pivot 37 along the boom length, and includes a tool pivot ram 39 adjacent the boom end 38 which may be attached to the preferred stinger mounting frame 12 to facilitate selective positioning of the stinger during planting procedures. Thus, vehicles with the above provisions may include conventional forms of excavators or backhoes, boom trucks or the like and the term "excavator"as used herein should be broadly construed.

To facilitate mounting of the stinger mounting frame 12, rearwardly extending mounting portions 13 (FIG. 1) of the frame 12 extend to meet with the boom end 38. Appropriate bolts, pins or other conventional fastening arrangements may be provided to connect the frame 12 to the boom. It is preferred that the form of mounting arrangement be provided in a manner by which the frame may be selectively pivoted by operation of the preferred tool pivot ram 39. Thus mounted, the planter 10 has the capability of articulation provided through operation of the boom and may be selectively positioned at locations in close proximity to the vehicle, or at distances within the boom reach. With the preferred tool pivot ram 39, angular positioning of the stinger 14 may also be provided to accommodate for various terrain conditions.

It is pointed out that other mounting arrangements may be provided between the stinger mounting frame 12 and vehicle. For example, a pivoted suspension arrangement could be provided as set forth in Applicant's prior United States patents as incorporated by reference above.

Figure 3:
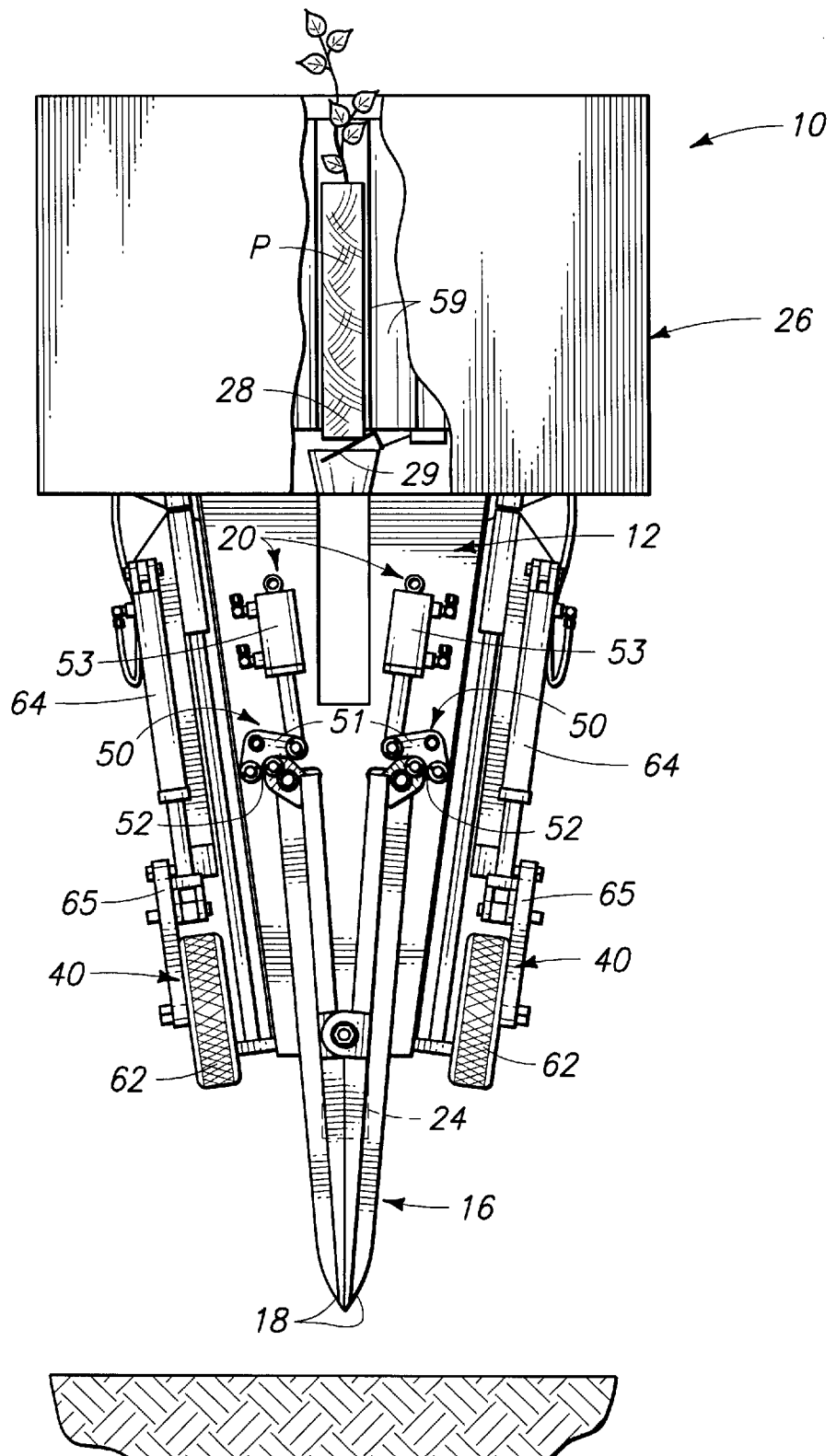
FIG. 3 is a view similar to FIG. 2 only showing portions broken away and a plant in position to drop through a plant release station.

In reference to FIGS. 3 and others, a preferred probe arrangement is shown in which the two probe members 16 are exemplified as being pivotally connected to one another such that movement of the probe ends 18 between the open and closed conditions is effected about the pivot axis. Such motion is preferably accomplished using the probe actuator which, in the exemplified embodiments, may include linkages 50 connecting the probes 16 and probe actuators 20. It is also preferable that the probe actuators 20 and linkages 50 be positioned to opposite sides of the plant receiving receptacle 24 (which is preferably situated between the probes and below the pivot).

More specifically, a preferred form of the linkages 50 may include bell cranks 51 and idler links 52 pivotally mounted to the stinger mounting frame 12 and having ends thereof connected to the probe actuators at upward ends of the probes. The actuators may be provided in the form of hydraulic ram cylinders 53 as illustrated or other actuator or linear actuator arrangements by which force is applied to cause movement of the probe ends 18 toward and away from one another. It is preferable to provide individually moveable probes with actuators 20 spaced to opposed sides of the plant receiving receptacle 24 to facilitate downward reception of successive plants from the preferred magazine 26 above. To this end, the ram cylinder actuators are preferably mounted in substantial alignment with the probes 16.

Attention is now directed to the magazine 26 which is configured to receive and organize a plurality of plants in a prescribed array. In preferred forms, the prescribed array is substantially circular. In more specific preferred forms, the array may be comprised of concentric, at least substantially circular groups of individual plant holders 59. The holders may be of a tubular configuration and arranged in the substantially circular groups with the central tube axes being preferably substantially parallel. Further, the tubular holders, while being parallel to one another in the concentric groups, are positioned to move into alignment with plant release stations 28 formed along a bottom side of the magazine. These release stations 28, in turn, are oriented above the internal plant receiving receptacle 24 which is formed as a pocket between the probes 16. Plants are therefore permitted to selectively drop through the plant release stations 28 and into the plant receiving receptacle 24.

Figure 11:
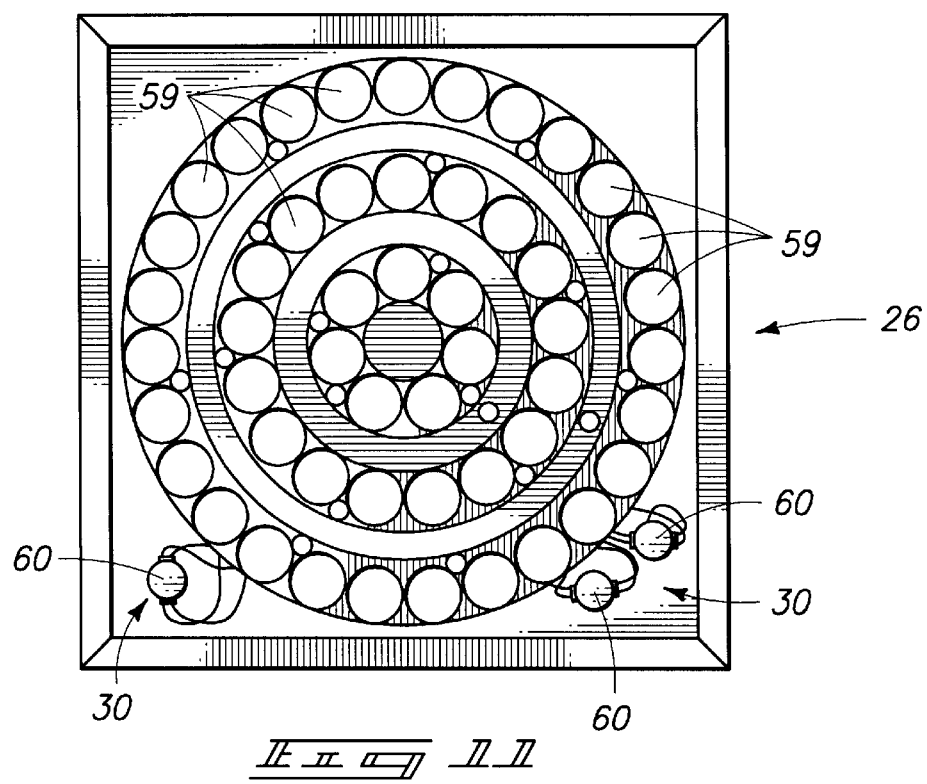
FIG. 11 is a top plan view of the plant magazine.
Figure 13:
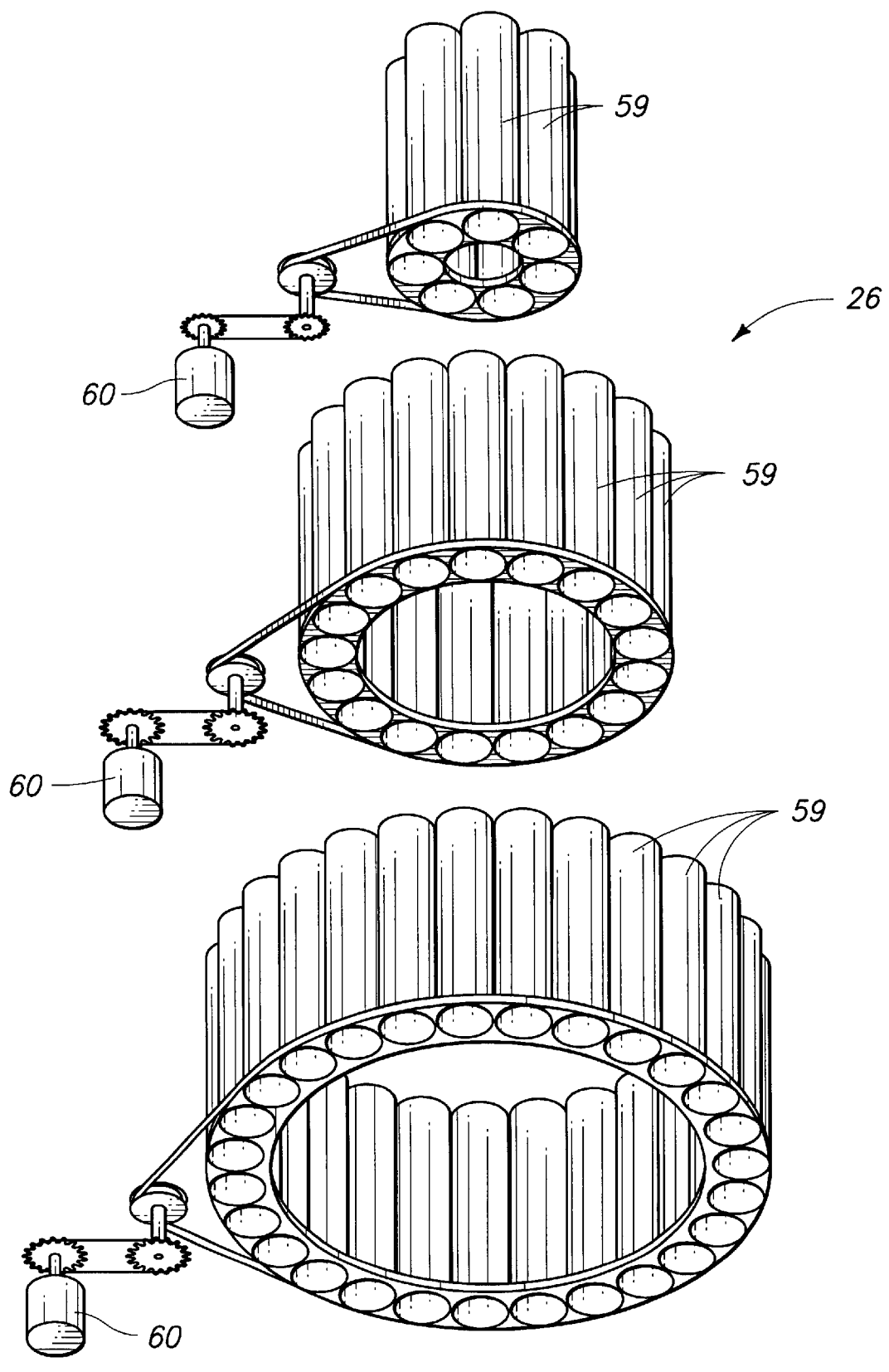
FIG. 13 is an exploded perspective view of a preferred magazine comprised of three sets of plant holders and their associated drive mechanisms.

The individual plant holders 59 may be arranged, as indicated above, in concentric groups, as exemplified in schematic form by FIG. 13. It is preferred that each of the groups be individually rotated about an axis by the plant feeder, which may be comprised of a rotary drive 60 for each group. Such drive may be comprised of electric, hydraulic, or pneumatic motors, one for each group, and connected by means of belts, pulleys, drive wheels, sprocket and chain arrangements, (FIG. 11, dashed lines, and FIG. 13) or similar mechanism by which operation of the drive motors will cause corresponding rotation of the associated groups of plant holders. It is preferred that such rotation be indexed by appropriate conventional controls such as limit switches or similar devices, so that each group of plant holders may be indexed to move successive plant holders in sequence over the associated plant release stations 28.

Figure 12:
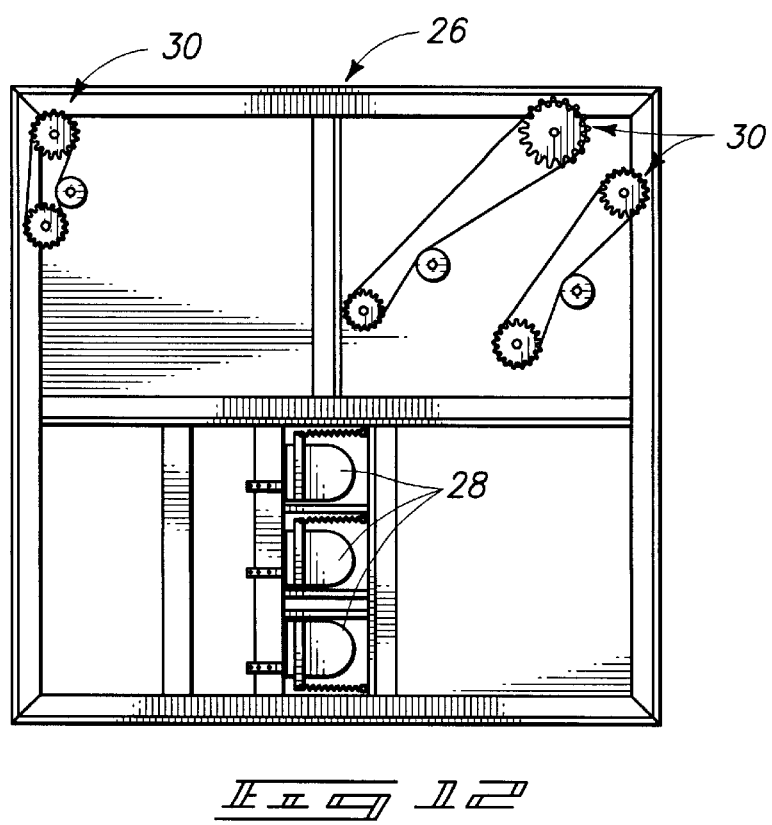
FIG. 12 is a bottom plan view of the plant magazine and plant release station.

The plant release stations 28 may be simply comprised of a hole formed through a bottom portion of the magazine. However, it is preferred that a trap door arrangement 29 (FIGS. 3, 12, and others) be provided which may be pivoted by the dropping plants and which may trigger appropriate signaling devices such as a light or annunciator, to indicate passage of a plant P from the magazine 26 and into the internal plant receiving receptacle 24. This may once again involve standard switching arrangements and circuitry to identify to the user that a plant is in position within the receptacle 24 and is ready for the next operation in the planting procedure.

It is pointed out that the controls and various drive mechanisms may be powered by appropriate connections to power sources supplied on the associated vehicle 33. Such controls and connections are believed to be well within the ordinary skill of control designers and will not be described in detail herein.

In preferred forms of the present planter 10, a packer arrangement 40 may be provided. Details of a preferred packer are exemplified by the drawings, especially in FIGS. 7, 8 and others. In preferred forms, two of the packer arrangements are provided, one for each of the probes 16. Further, it is preferred that the packers 40 be moveable with the probes and be individually controlled to facilitate packing of the planting media or ground surface once the probes have been withdrawn and the plant is in place.

To accomplish the above, the exemplary probe arrangements may be mounted to the stinger mounting frame 12 adjacent an associate probe. The preferred packer member is a wheel 62 slidably mounted by a slide carriage 71 and guide rod arrangements 63 to the stinger mounting frame 12. The preferred packer wheel 62 is also moveable responsive to a biasing member 64 that normally urges the associated packer member toward the probe bottom ends 18.

In the preferred forms as illustrated, the packer biasing members 64 may be comprised of gas-filled cylinders and appropriate valving that may be selectively adjusted to determine the amount of yieldable resistance to downward pressure placed against the packers during the planting operation. The gas-filled cylinders may be mounted between the guide arrangement and pivoted packer brackets 65 which are pivotally mounted to the guide at one end, and mount the packer wheels at opposed ends. Thus, the gas-filled cylinders will normally urge the brackets and packer wheels downwardly toward the probe ends 18 and will allow upward movement only upon overcoming the resistance offered by the pressurized cylinders.

The guide arrangements and packers may be selectively moved along a length of the probes by provision of positioners 70. The positioners may be provided in the form of hydraulic ram cylinders 72 mounted between the stinger mounting frame 12 and guide carriages 71 (that mount the packers 40 and biasing members 64) such that extension and retraction of the cylinders will cause resulting linear motion of the packers along the probes 16. The positioner cylinders 72 may also be attached to and controlled from the vehicle 33. It is noted however, that it may be preferred to operate the positioners independently (see FIG. 5) in order to facilitate positioning of the packers 40 in uneven terrain conditions, or in other possible circumstances where, for example, it may even be desired to use one packer instead of both.

Operation of the planter will be discussed now in terms of the process for planting. The process may initially begin by mounting the stinger mounting frame 12 to the boom of a boom-type excavator. This step may be performed at a factory where the combination may be assembled with the boom and vehicle.

On the other hand, if the stinger mounting frame and associated elements are provided as a subassembly for connection to an existing boom-type vehicle, the mounting procedure is accomplished simply by removing any existing tools from the boom end, and attaching the stinger mounting frame by provision of the mounting brackets and connection fasteners. At this point, appropriate electric and hydraulic connections may also be made to facilitate operation of the device. Once the frame is appropriately mounted and driving connections are made, the planting procedure may continue.

Individual plants may be hand-fed to the plant holders 59 within the magazine 26. There is no necessity that the plants be of the same variety, or that they be of a particular size.

Figure 4:
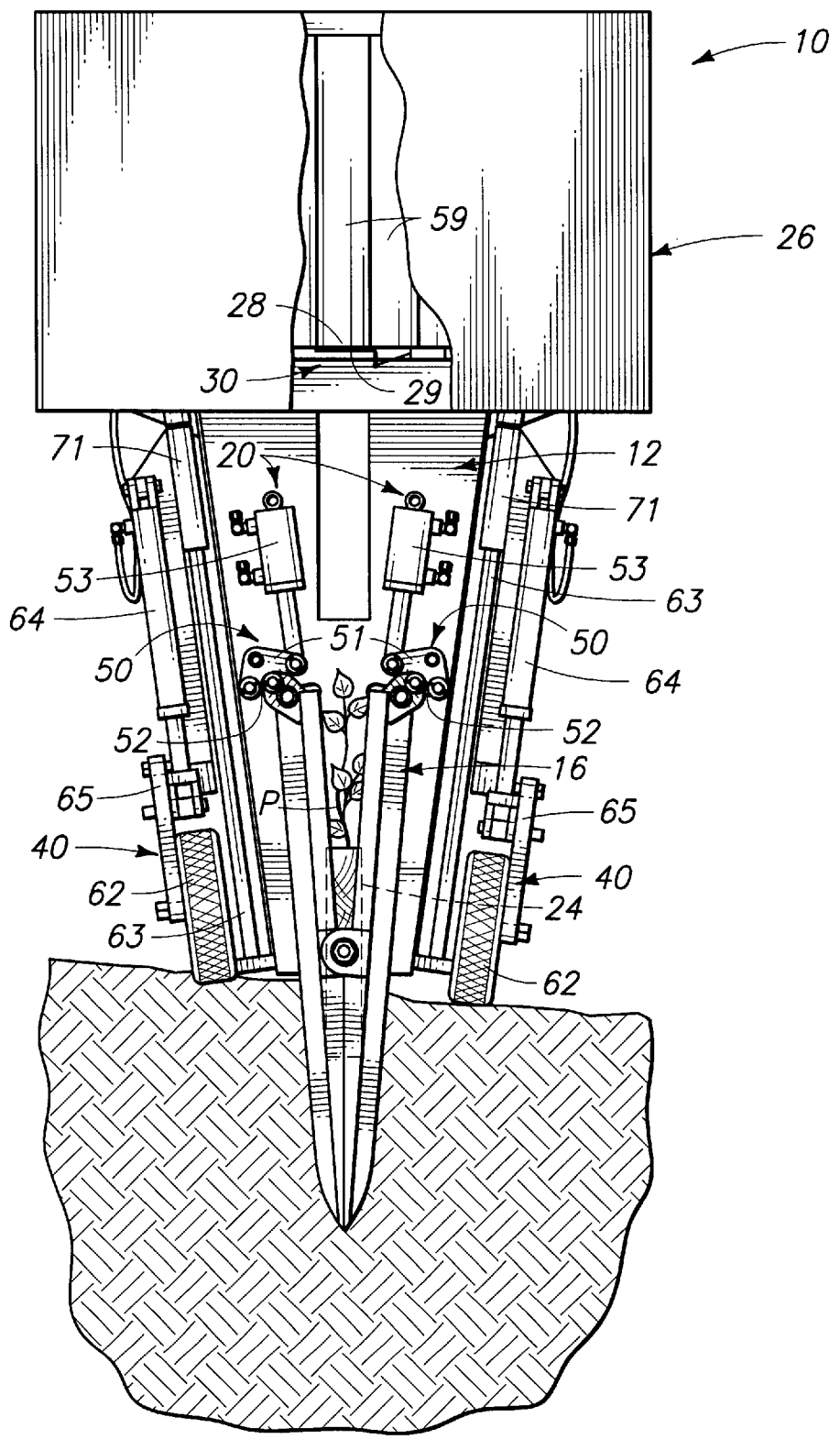
FIG. 4 is a view similar to FIG. 3 only showing the probes inserted in planting media and the plant positioned in an internal plant receiving receptacle.
Figure 5:
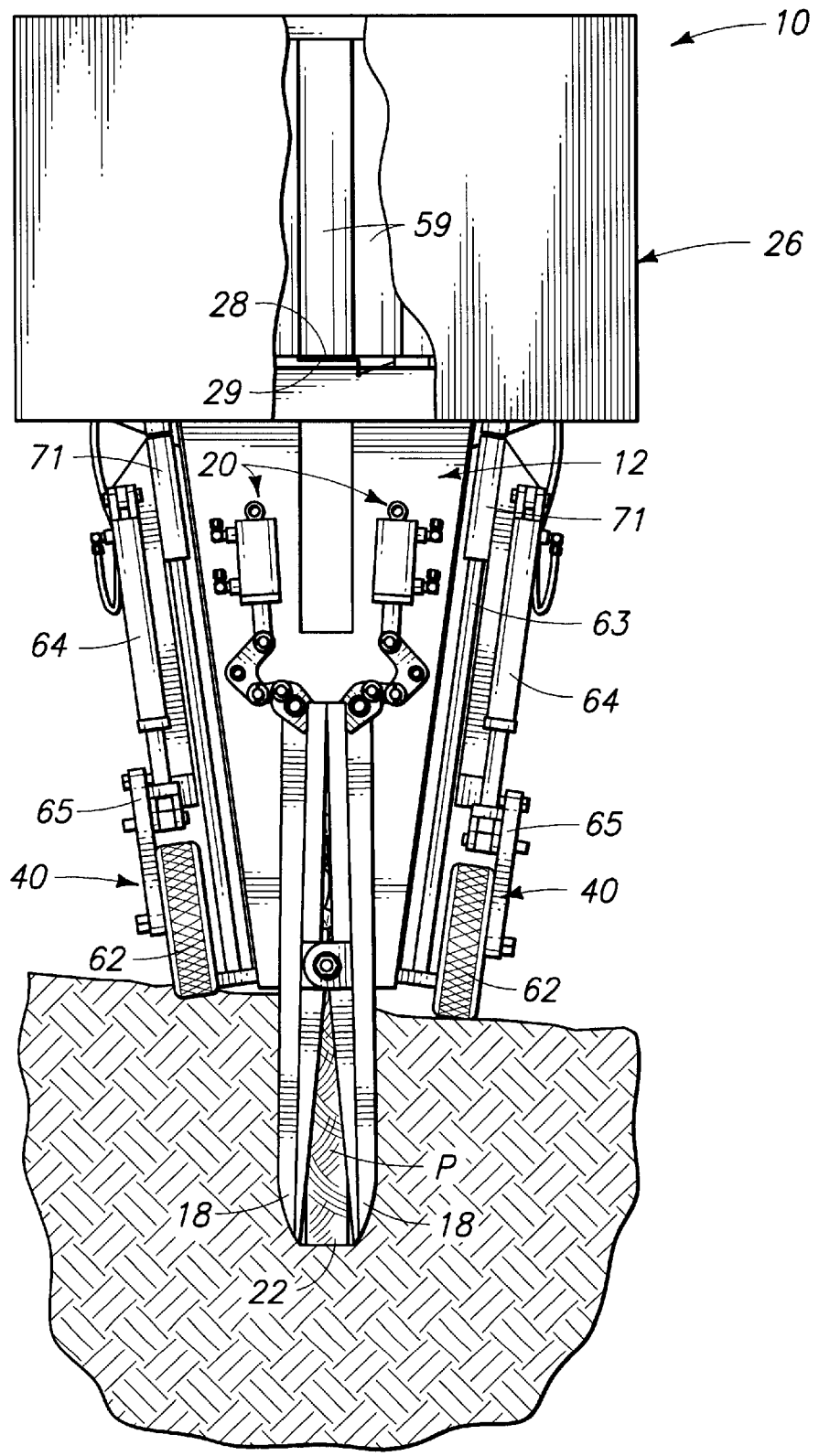
FIG. 5 is a view similar to FIG. 4 only showing release of the plant through a plant discharge opening between probe ends.

Once the desired number of plants is loaded into the holders 59, the vehicle operator may move the vehicle into a position where planting is to occur. The operator may then use the appropriate controls to move the boom into position with the probes 16 engaging the ground or other plant media at a selected site. Appropriate controls are then operated to force the probes into the ground to a desired depth (FIG. 4). At this time or slightly previous to this time, the user may operate the plant feeder 40 by selecting one of the rotary drive assemblies 60 to bring a selected plant P into alignment with an adjacent plant release station 28. Once the selected plant holder comes into alignment with the release station, the plant will drop freely through the release station 28 and into the plant receiving receptacle 24 between the closed probes 16. The plant is now in position to be released.

Figure 6:
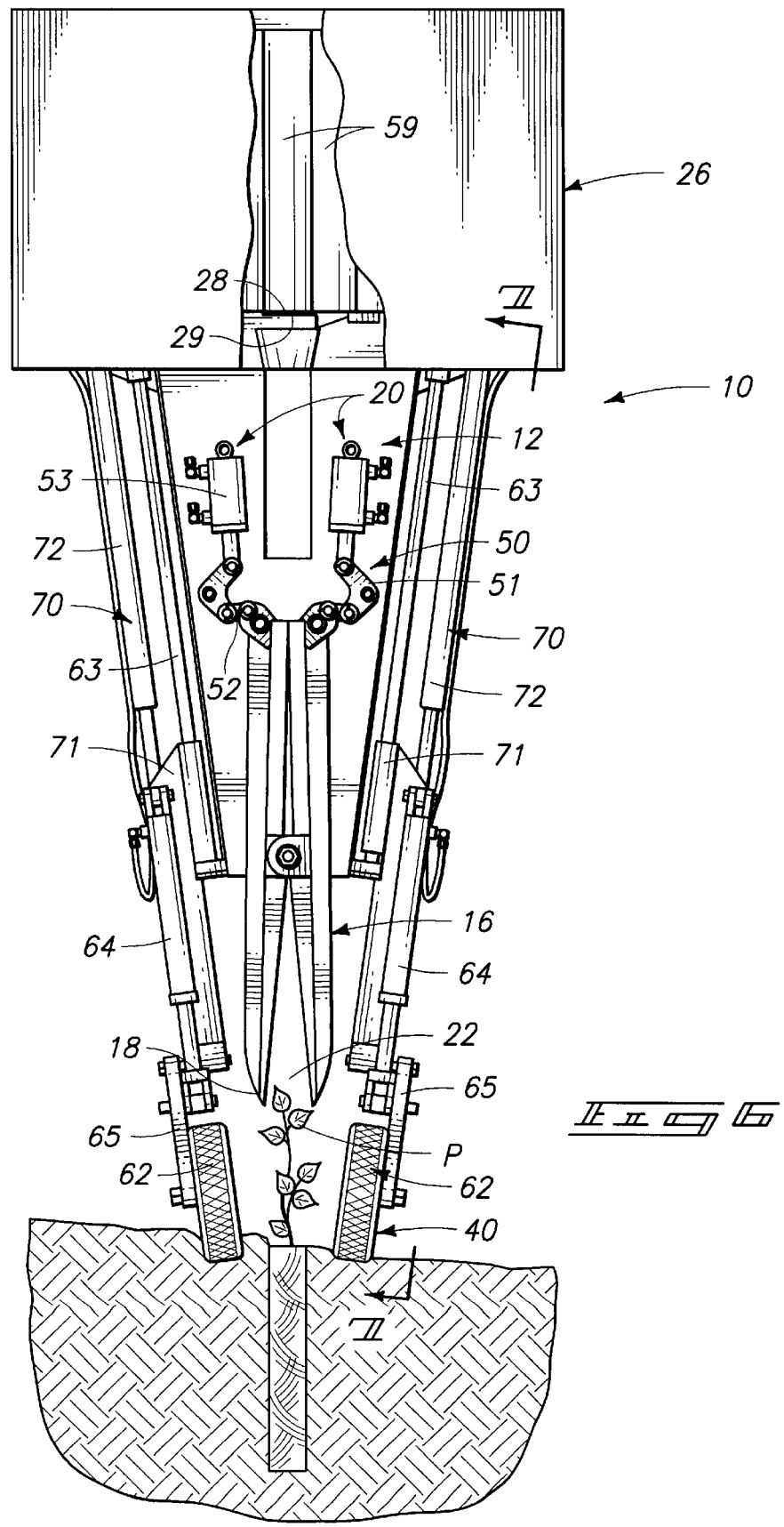
FIG. 6 is a view similar to FIG. 5 only showing retraction of the probes and packing of the plant media about the plant.

Once the probes reach the desired depth in the planting medium, the actuators 20 may be operated to open the probes (FIG. 5) thereby discharging the plant through the plant discharge opening 22 that forms between the probe ends 18. The boom may then be operated to lift the probes upwardly and leave the plant in the deposited position (FIG. 6).

If it is desired, the packers 40 may be operated at this point to move into engagement with the ground surface and be forcefully positioned to opposite sides of the plant in order to press the ground or planting media into position about the plant. Selective resistance offered by the biasing members 64 for the packers may be used to eliminate the need for precise control of the boom position to accomplish the desired packing results.

It is noted that the packers 40 may simply be used to press the ground or planting media inwardly against the plant as the probes are withdrawn. It is also possible, especially with the wheel configurations illustrated, to move the boom slightly in a back, forward or back and forward motion; moving the packer wheels along the surface to press the planting media against the plant and to produce a water gathering trough or recess along the surface area around the plant.

Once the packing operation is complete, the user may lift the boom and move the probes to another location to repeat the planting process.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An expandable stinger planter, comprising:

a stinger mounting frame configured for articulation;

a stinger comprised of a pair of elongated probes mounted to the stinger mounting frame, extending to bottom ends, and configured for selective positioning and ground penetration along a desired ground-penetrating axis;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned above the plant receiving receptacle such that a plant moved to the plant release station may drop into the plant receiving receptacle, to be discharged from the plant receiving receptacle through the plant discharge opening.

2. An expandable stinger planter as defined by claim 1, wherein the pair of elongated probes are pivotably mounted to the stinger mounting frame, wherein the actuator assembly is comprised of:

probe actuators mounted on the stinger mounting frame;

linkages connecting the probes and probe actuators; and wherein the probe actuators and linkages are positioned to opposed sides of the plant receiving receptacle.

3. An expandable stinger planter as defined by claim 2 wherein the probe actuators are comprised of ram cylinders mounted in substantial alignment with the probes.

4. An expandable stinger planter as defined by claim 1 wherein the stinger mounting frame includes an excavator boom mounting bracket with attachment points spaced to accommodate an excavator boom end.

5. An expandable stinger planter as defined by claim 4 wherein the stinger mounting frame and excavator boom mounting bracket are integral.

6. An expandable stinger planter as defined by claim 1, wherein the probes include a length dimension and are joined for pivotal movement at a probe pivot axis that is located approximately mid-way along the length dimension.

7. An expandable stinger planter as defined by claim 1 wherein the array is at least substantially circular.

8. An expandable stinger planter, comprising:
   a vehicle including a movable boom extending to a boom end;
   a stinger mounting frame mounted to the boom end for articulation in three-dimensional space responsive to movement of the boom;
   a stinger comprised of a pair of elongated probes mounted to the stinger mounting frame and extending to bottom ends configured for ground penetration along a desired ground-penetration axis;
   an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;
   an internal plant receiving receptacle within the probes that is open to the plant discharge opening;
   a plant magazine on the stinger mounting frame configured to receive and organize a plurality of plants in a prescribed array;
   wherein the plant magazine includes at least one plant release station, through which successive plants may be discharged into the plant receiving receptacle; and
   a plant feeder adjacent the plant magazine and operable to move a plant in the plant magazine to the plant release station;
   wherein the plant magazine and plant release station are positioned in relation to the plant receiving receptacle such that a plant moved to the plant release station may drop into the plant receiving receptacle, to be discharged from the plant receiving receptacle through the plant discharge opening.

9. An expandable stinger planter as defined by claim 8, wherein the pair of elongated probes are pivotably mounted to the stinger mounting frame, wherein the actuator assembly is comprised of:
   probe actuators mounted on the stinger mounting frame;
   linkages connecting the probes and probe actuators; and
   wherein the probe actuators and linkages are positioned to opposed sides of the plant receiving receptacle.

10. An expandable stinger planter as defined by claim 8 wherein the stinger mounting frame includes an excavator boom mounting bracket with attachment points spaced to accommodate the boom, and wherein the boom end comprises an excavator boom end.

11. An expandable stinger planter as defined by claim 10 wherein the stinger mounting frame and excavator boom mounting bracket are integral.

12. An expandable stinger planter as, defined by claim 8 further comprising at least one packer member operably mounted to the stinger mounting frame and positioned adjacent the probes.

13. An expandable stinger planter as defined by claim 8, wherein the array is at least substantially circular.

14. An expandable stinger planter, comprising:
   a stinger mounting frame;
   a stinger comprised of a pair of elongated probes mounted to the stinger mounting frame and extending to bottom ends configured for ground penetration;
   an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;
   an internal plant receiving receptacle within the probes that is open to the plant discharge opening;
   a plant magazine on the stinger mounting frame configured to receive and organize a plurality of plants in a prescribed array;
   wherein the plant magazine includes at least one plant release station, through which successive plants may be discharged into the plant receiving receptacle; and
   a plant feeder adjacent the plant magazine and operable to move a plant in the plant magazine to the plant release station;
   wherein the plant magazine and the plant release station are positioned above the plant receiving receptacle such that a plant moved to the plant release station may drop into the plant receiving receptacle, to be discharged from the plant receiving receptacle through the plant discharge opening; and
   at least one packer member operably mounted to the stinger mounting frame and positioned adjacent the probes.

15. An expandable stinger planter as defined by claim 14 further comprising a packer biasing member normally urging the packer member toward the probe bottom ends.

16. An expandable stinger planter as defined by claim 14 wherein the packer member is comprised of a packer wheel, and further comprising a packer wheel biasing member normally urging the packer wheel toward the probe bottom ends.

17. An expandable stinger planter as defined by claim 14, further comprising a packer positioner mounting the packer to the stinger mounting frame for selective motion toward and away from the probe bottom ends.

18. An expandable stinger planter as defined by claim 14, further comprising:
   a packer positioner mounting the packer to the stinger mounting frame for selective motion toward and away from the probe bottom ends; and
   a packer biasing member mounted to the packer positioner and packer, yieldably urging the packer member toward the probe bottom ends.

19. A planting process, comprising the steps of:
   mounting a stinger mounting frame to a boom of a boom type excavator;
   wherein a stinger is mounted to the stinger mounting frame and is comprised of a pair of elongated probes extending to bottom ends that are movable between an open position wherein the bottom ends are spaced apart to form a plant discharge opening, and a closed position wherein the probe ends are closed together;
   providing a plant magazine on the stinger mounting frame;
   placing plants in the magazine;
   moving a selected plant in the magazine to a plant release station;
   moving the selected plant from the plant release station to a position between the probes in the closed position;
   operating the boom to drive the bottom ends of the probes into a planting media;

moving the probes to the open position; and lifting the probes from the planting media while leaving the plant in the planting media.

20. The planting process of claim 19 comprising the further step of packing the planting media about the plant.

21. The planting process of claim 19 wherein the step of moving the selected plant from the plant release station to a position between the probes in the closed position is accomplished by dropping the plant from a location above the position between the probes.

22. An expandable stinger planter, comprising:

a stinger mounting frame;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned above the plant receiving receptacle such that a plant moved to the plant release station may drop into the plant receiving receptacle, to be discharged from the plant receiving receptacle through the plant discharge opening; and wherein the magazine is comprised of concentric, at least substantially circular groups of individual plant holders.

23. An expandable stinger planter as defined by claim 22 further comprising a plant release station for each group of plant holders, and a rotary drive operable to rotate each group about an axis past the plant release station.

24. An expandable stinger planter, comprising:

a vehicle including a movable boom extending to a boom end;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening; and wherein the magazine is comprised of concentric, at least substantially circular groups of individual plant holders.

25. An expandable stinger planter as defined by claim 24 further comprising a plant release station for each group of plant holders, and a rotary drive operable to rotate each group about an axis past the plant release station.

26. An expandable stinger planter, comprising:

a stinger mounting frame;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

at least one packer member operably mounted to the stinger mounting frame and positioned adjacent the probes; and a packer positioner mounting the packer to the stinger mounting frame for selective motion toward and away from the probe bottom ends.

27. The expandable stinger planter of claim 26 further comprising a packer biasing member mounted to the packer positioner and the packer, yieldably urging the packer member toward the probe bottom ends.

28. An expandable stinger planter, comprising:

a stinger mounting frame;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

at least one packer member operably mounted to the stinger mounting frame and positioned adjacent the probes; and a packer biasing member, yieldably urging the packer member toward the probe bottom ends.

29. The expandable stinger planter of claim 28 wherein the packer biasing member is comprised of an adjustable pneumatic spring.

30. An expandable stinger planter, comprising:

a stinger mounting frame;

a stinger comprised of a pair of elongated probes mounted to the stinger mounting frame and extending to bottom ends configured for ground penetration, wherein the pair of elongated probes are pivotally mounted to the stinger mounting frame;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening, and wherein the actuator assembly is comprised of probe actuators mounted on the stinger mounting frame, linkages connecting the probes and probe actuators, and wherein the probe actuators and the linkages are positioned to opposed sides of the plant receiving receptacle;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned above the plant receiving receptacle such that a plant moved to the plant release station may drop into the plant receiving receptacle, to be discharged from the plant receiving receptacle through the plant discharge opening; and wherein the linkages include bellcrank and idler links pivotably mounted to the stinger mounting frame and having ends thereof connected to the probe actuators and probes.

31. An expandable stinger planter, comprising:

a vehicle including a movable boom extending to a boom end;

a stinger mounting frame mounted to the boom end for movement responsive to movement of the boom;

a stinger comprised of a pair of elongated probes pivotally mounted to the stinger mounting frame and extending to bottom ends configured for ground penetration;

an actuator assembly on the stinger mounting frame, comprising probe actuators mounted on the stinger mounting frame and linkages connecting the probes and probe actuators, the probe actuators and the linkages positioned to opposed sides of the plant receiving receptacle, and the actuator assembly connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening; and wherein the linkages include bellcrank and idler links pivotably mounted to the stinger mounting frame and having ends thereof connected to the probe actuators and probes.

32. An expandable stinger planter, comprising:

a vehicle including a movable boom extending to a boom end;

a stinger mounting frame mounted to the boom end for movement responsive to movement of the boom;

a stinger comprised of a pair of elongated probes pivotally mounted to the stinger mounting frame and extending to bottom ends configured for ground penetration;

an actuator assembly on the stinger mounting frame, comprised of probe actuators mounted on the stinger mounting frame and linkages connecting the probes and the probe actuators, the probe actuators and the linkages positioned to opposed sides of the plant receiving receptacle, and the actuator assembly connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening; and wherein the probe actuators are comprised of ram cylinders mounted in substantial alignment with the probes.

33. An expandable stinger planter, comprising:

a vehicle including a movable boom extending to a boom end;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening;

at least one packer member operably mounted to the stinger mounting frame and positioned adjacent the probes; and a packer biasing member normally urging the packer member toward the probe bottom ends.

34. An expandable stinger planter, comprising:

a vehicle including a movable boom extending to a boom end;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening;

at least one packer member operably mounted to the stinger mounting frame and positioned adjacent the probes, wherein the packer member is comprised of a packer wheel; and a packer wheel biasing member normally urging the packer wheel toward the probe bottom ends.

35. An expandable stinger planter, comprising:

a vehicle including a movable boom extending to a boom end;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening;

at least one packer member operably mounted to the stinger mounting frame and positioned adjacent the probes; and a packer positioner mounting the packer to the stinger mounting frame for selective motion toward and away from the probe bottom ends.

36. An expandable stinger planter, comprising:

a vehicle including a movable boom extending to a boom end;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening;

a plant magazine on the stinger mounting frame configured to receive and organize a plurality of plants in a prescribed array;

wherein the plant magazine includes at least one plant release station, through which successive plants may be discharged into the plant receiving receptacle; and a plant feeder adjacent the plant magazine and operable to move a plant in the plant magazine to the plant release station;

wherein the plant magazine and plant release station are positioned in relation to the plant receiving receptacle such that a plant moved to the plant release station may drop into the plant receiving receptacle, to be discharged from the plant receiving receptacle through the plant discharge opening;

at least one packer member operably mounted to the stinger mounting frame and positioned adjacent the probes;

a packer positioner mounting the packer to the stinger mounting frame for selective motion toward and away from the probe bottom ends; and a packer biasing member mounted to the packer positioner and packer, yieldably urging the packer member toward the probe bottom ends.

37. An expandable stinger planter, comprising:

a stinger mounting frame configured for multiple-dimension articulation;

a stinger comprised of a pair of elongated probes mounted to the stinger mounting frame and extending to bottom ends configured forground penetration along a desired one of a plurality of ground-penetrating axes;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening; and at least one packer member operably mounted to the stinger mounting frame and positioned adjacent the probes.

38. An expandable stinger planter, comprising:

a vehicle including a movable boom extending to a boom end configured for articulated positioning in space;

a stinger mounting frame mounted to the boom end for movement responsive to movement of the boom;

a stinger comprised of a pair of elongated probes mounted to the stinger mounting frame and extending to bottom ends configured for ground penetration;

an actuator assembly on the stinger mounting frame and connected to at least one of the probes to shift the bottom ends relative to one another between a closed position wherein the bottom ends are at least substantially closed together, and an open position wherein the bottom ends are opened and form a plant discharge opening;

an internal plant receiving receptacle within the probes that is open to the plant discharge opening; and at least one packer member operably mounted to the stinger mounting frame and positioned adjacent the probes.

* * * * *

UNITED STATES PATENT AND TRADEMARK OFFICE
CERTIFICATE OF CORRECTION

PATENT NO.     : 6,615,753 B1
DATED          : September 9, 2003
INVENTOR(S)    : Daniel A. Culley It is certified that error appears in the above-identified patent and that said Letters Patent is hereby corrected as shown below:

Title page,
Item [73], Assignee, delete Assignees as written, and insert -- [73] Assignee:
Northwest Revegetation and Ecological Restoration, Inc., Hamilton, MT (US) --

Column 2,
Line 66, delete "forms of my invention," and insert -- forms of Applicant's invention --.

Column 4,
Lines 28-29, delete "bottom 18 ends", and insert -- bottom ends 18 --.

Column 5,
Line 21, delete "Figs. 3 and others,", and insert -- Fig. 3 and others, --.

Column 9,
Line 57, delete "planter as, defined by", and insert -- planter as defined by --.

Column 17,
Line 22, delete "configured forground", and insert -- configured for ground --.

Signed and Sealed this

Tenth Day of February, 2004

JON W. DUDAS
*Acting Director of the United States Patent and Trademark Office*